United States Patent
Takahashi et al.

(10) Patent No.: US 7,016,700 B2
(45) Date of Patent: Mar. 21, 2006

(54) COMMUNICATION TERMINAL UNIT CAPABLE OF RECEIVING A MESSAGE AND METHOD FOR IDENTIFYING A MESSAGE SENDER IN THE SAME

(75) Inventors: Shinya Takahashi, Tokyo (JP); Akira Tanaka, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 539 days.

(21) Appl. No.: 10/101,711

(22) Filed: Mar. 21, 2002

(65) Prior Publication Data

US 2002/0137539 A1    Sep. 26, 2002

(30) Foreign Application Priority Data

Mar. 21, 2001   (JP)   ............................. 2001-081284

(51) Int. Cl.
- *H04Q 7/20* (2006.01)
- *H04Q 7/32* (2006.01)
- *H04Q 7/38* (2006.01)

(52) U.S. Cl. ............................. 455/550.1; 455/414.1; 455/414.4; 455/412.1; 455/412.2; 455/422.1; 455/403; 709/206; 709/2.8; 709/2.9; 726/13; 704/2; 704/6

(58) Field of Classification Search ................ 715/530; 709/206, 218, 219, 203, 202, 214, 215, 216, 709/228, 231; 455/550.1, 403, 412.1, 412.2, 455/414.1, 414.4, 422.1, 517, 556.1, 556.2, 455/445, 426.2, 426.1, 500; 704/2, 6, 10; 726/13

See application file for complete search history.

(56) References Cited

U.S. PATENT DOCUMENTS

| | | | |
|---|---|---|---|
| 5,265,145 A | | 11/1993 | Lim |
| 5,546,447 A | | 8/1996 | Skarbo et al. |
| 5,923,848 A | * | 7/1999 | Goodhand et al. .......... 709/219 |
| 5,940,823 A | | 8/1999 | Schreiber et al. |
| 6,144,934 A | * | 11/2000 | Stockwell et al. ............. 704/1 |
| 2002/0007301 A1 | * | 1/2002 | Reuning ........................ 705/9 |
| 2002/0065897 A1 | * | 5/2002 | Voticky et al. ............. 709/207 |
| 2002/0087647 A1 | * | 7/2002 | Quine et al. ................. 709/206 |
| 2003/0046353 A1 | * | 3/2003 | Chung et al. ............... 709/206 |
| 2003/0115040 A1 | * | 6/2003 | Xing ............................. 704/8 |

FOREIGN PATENT DOCUMENTS

WO    WO 99/62000 A    12/1999

OTHER PUBLICATIONS

European Search Report issued by European Patent Office on Jul. 17, 2003 in European application No. 02003140.
European Patent Office Action issued by European Patent Office on Oct. 23, 2003, in European application No. 02003140.

* cited by examiner

*Primary Examiner*—Keith Ferguson
(74) *Attorney, Agent, or Firm*—Finnegan, Henderson, Farabow, Garrett & Dunner, L.L.P.

(57) ABSTRACT

A communication terminal unit capable of identifying a message sender by comparing a source address attached to a received message with an address registered in a memory of the unit in advance, which can identify the message sender even if the source address has an error by regarding the erroneous source address to be the same as the registered address when the difference between these two addresses is within a predetermined permissible range.

14 Claims, 8 Drawing Sheets

SCREEN IMAGE

| aAa@aaa.com |
|---|
| XYZ, INC. |

Fig. 6(a)

INDIVIDUAL REGISTERED INFORMATION

| aaa@aaa.com |
|---|
| XYZ, INC. |
| MELODY PATTERN 1 |
| ANIMATION PATTERN 1 |
| VIBRATION PATTERN 1 |
| LED EMISSION PATTERN 1 |

Fig. 6(b)

SCREEN IMAGE

| aaa@aaa.com |
| XYZ, INC. |

*Fig. 8(a)*

INDIVIDUAL REGISTERED INFORMATION

| aaa@aaa.com |
| XYZ, INC. |
| MELODY PATTERN 1 |
| ANIMATION PATTERN 1 |
| VIBRATION PATTERN 1 |
| LED EMISSION PATTERN 1 |

*Fig. 8(b)*

COMMUNICATION TERMINAL UNIT CAPABLE OF RECEIVING A MESSAGE AND METHOD FOR IDENTIFYING A MESSAGE SENDER IN THE SAME

CROSS-REFERENCE TO RELATED APPLICATIONS

This application is based upon and claims the benefit of priority from the prior Japanese Patent Application No. 2001-081284, filed on Mar. 21, 2001; the entire contents of which are incorporated herein by reference.

FIELD OF THE INVENTION

The present invention relates to a communication terminal unit capable of receiving a message. The present invention, more particularly, relates to a communication terminal unit capable of identifying a message sender by a source address attached to the message even if the source address has an error.

BACKGROUND

Many wireless communication terminal units, such as a personal digital assistant (PDA) and a cellular phone, have recently had an e-mail function as well as wire communication terminal units, such as a personal computer (PC).

These communication terminal units are generally equipped with a telephone directory in which a user can register information about his/her communication partners (hereinafter referred to as "registered information"). Each communication partner's registered information includes a pattern for informing the user of having received an e-mail from the communication partner (hereinafter referred to as "informing pattern"), which can be predetermined by the user for each communication partner, in addition to his/her name and e-mail address.

When receiving an e-mail from a sender, each communication terminal unit searches the telephone directory for an e-mail address that is the same as a source address recorded in the header of the e-mail. When finding the same address, the communication terminal unit informs the user of the reception of the e-mail and shows the sender's name on a display, in accordance with the informing pattern and name corresponding to the found e-mail address. It is very convenient for a user to be able to identify an e-mail sender by an informing pattern and name before displaying the body of the e-mail.

However, the source address recorded in the header of the e-mail is not always correct because an error may occur during transmission of the e-mail Consequently, there have been cases where although necessary information is stored in the telephone directory, the communication terminal unit can neither inform the user of the reception of the e-mail nor show the e-mail sender's name on the display because the communication terminal unit can not find an e-mail address that is the same as the received erroneous source address.

SUMMARY

In accordance with an embodiment of the present invention, there is provided a communication terminal unit capable of receiving a message. The communication terminal unit comprises a memory to store a first address, first means for determining whether a second address, which is included in the received message, agrees with the first address, and second means for determining whether the difference between the first and second addresses is within a predetermined permissible range when the first determining means concludes that the first and second addresses do not agree, and for recognizing the second address to be in agreement with the first address when the difference is within the permissible range.

Also in accordance with an embodiment of the present invention, there is provided a communication terminal unit capable of receiving a message. The communication terminal unit comprises a memory to store a plurality of first addresses, first means for searching the memory for the first address which agrees with a second address included in the received message, second means for searching the memory for the first address which is different from the second address within a permissible range when the first searching means concludes that no first addresses are in agreement with the second address, and recognizing the second address to be in agreement with the first address when the difference is within the permissible range.

Further in accordance with an embodiment of the present invention, there is provided a method for identifying a message sender in a communication terminal unit. The method comprises storing a first address in a memory, receiving a message, first determining whether a second address, which is included in the received message, agrees with the first address, second determining whether the difference between the first and second addresses is within a predetermined permissible range when the first determining means concludes that the first and second addresses do not agree, and recognizing the second address to be in agreement with the first address when the difference is within the permissible range.

Additionally in accordance with an embodiment of the present invention, there is provided a method for identifying a message sender in a communication terminal unit. The method comprises storing a plurality of first addresses in a memory, receiving a message, first searching the memory for the first address which agrees with a second address included in the received message, second searching the memory for the first address which is different from the second address within a permissible range when the first searching means concludes that no first addresses are in agreement with the second address, and recognizing the second address to be in agreement with the first address when the difference is within the permissible range.

BRIEF DESCRIPTION OF THE DRAWINGS

The accompanying drawings, which are incorporated in and constitute section of this specification, illustrate various embodiments and/or features of the present invention and together with the description, serve to explain the principles of the present invention. In the drawings:

FIGS. 6(a) and 6(b) are diagrams respectively showing a screen image and the corresponding registered information stored in the directory memory shown in FIG. 2;

FIGS. 8(a) and 8(b) are diagrams respectively showing another screen image and the corresponding registered information stored in the directory memory shown in FIG. 2.

DETAILED DESCRIPTION

First Embodiment

With reference to FIGS. 1 through 6, a first embodiment of the present invention will now be explained. The first embodiment exemplifies a short message service as an e-mail distribution service, the short message service by which an e-mail is sent between mobile stations in accordance with a protocol predetermined by a carrier.

Figure 1:
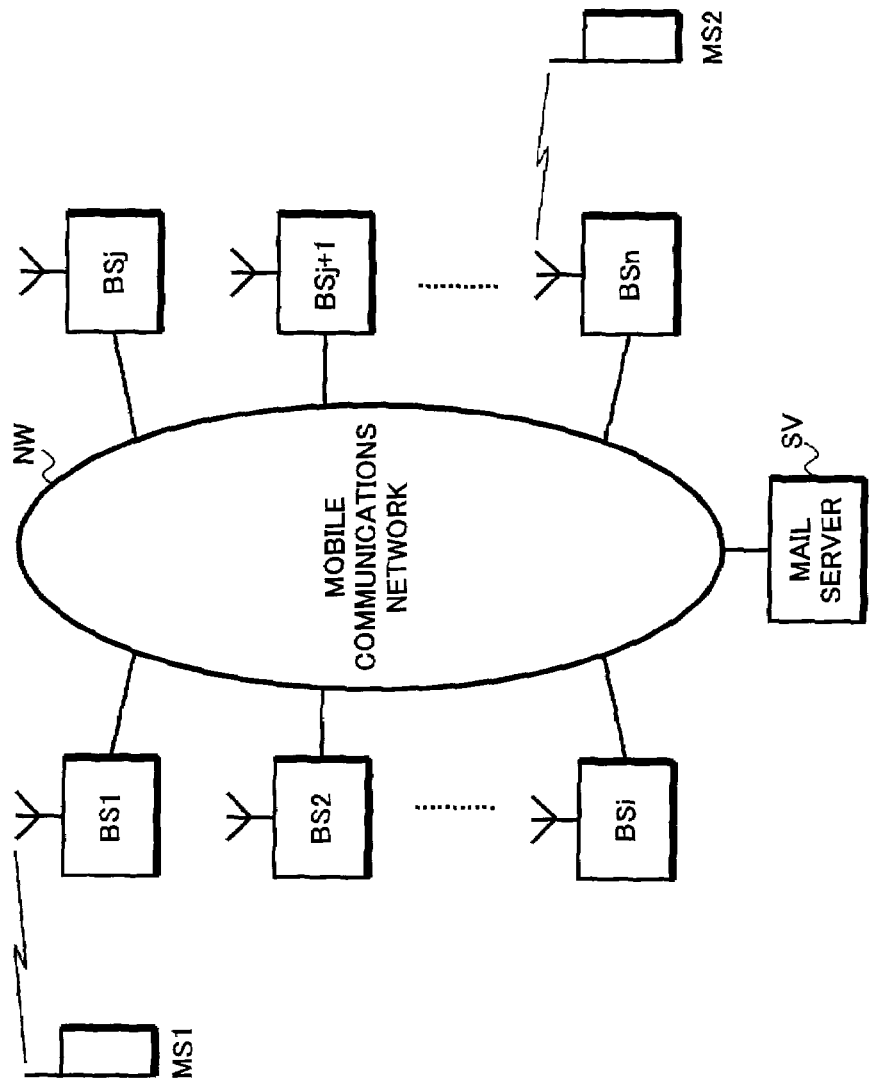
FIG. 1 is a diagram showing a configuration of a mobile-communications network system connected with mobile stations consistent with the embodiments of the present invention.

FIG. 1 is a diagram showing a configuration of a mobile-communications network system connected with mobile stations consistent with the embodiments of the present invention. A plurality of base stations BS1, BS2, . . . , BSi, BSj, BSj+1, . . . , BSn, is placed in an area covered by the mobile-communications network system. Each of these base stations BS1 through BSn has a radio zone referred to as "cell", and is connected to a mobile-communications network NW via a cable line. Moreover, network NW may be connected to another computer networks (not shown) such as a cable-communications network and the Internet.

For example, in the radio zone of base station BS1, a mobile station MS1 can connect to base station BS1 via a radio channel, and to network NW via base station BS1. Further, by being exchange controlled by network NW, mobile station MS1 can connect to another mobile station MS2, which is in the radio zone of base station BSn. Similarly, mobile station MS1 can communicate with another station (not shown) cabled to network NW.

In addition to an exchange control function, network NW is equipped with a mail server SV for providing the short message service. When receiving an e-mail from a sender's mobile station, mail server SV stores it and then sends it to a destination mobile station in accordance with a predetermined protocol.

Figure 2:
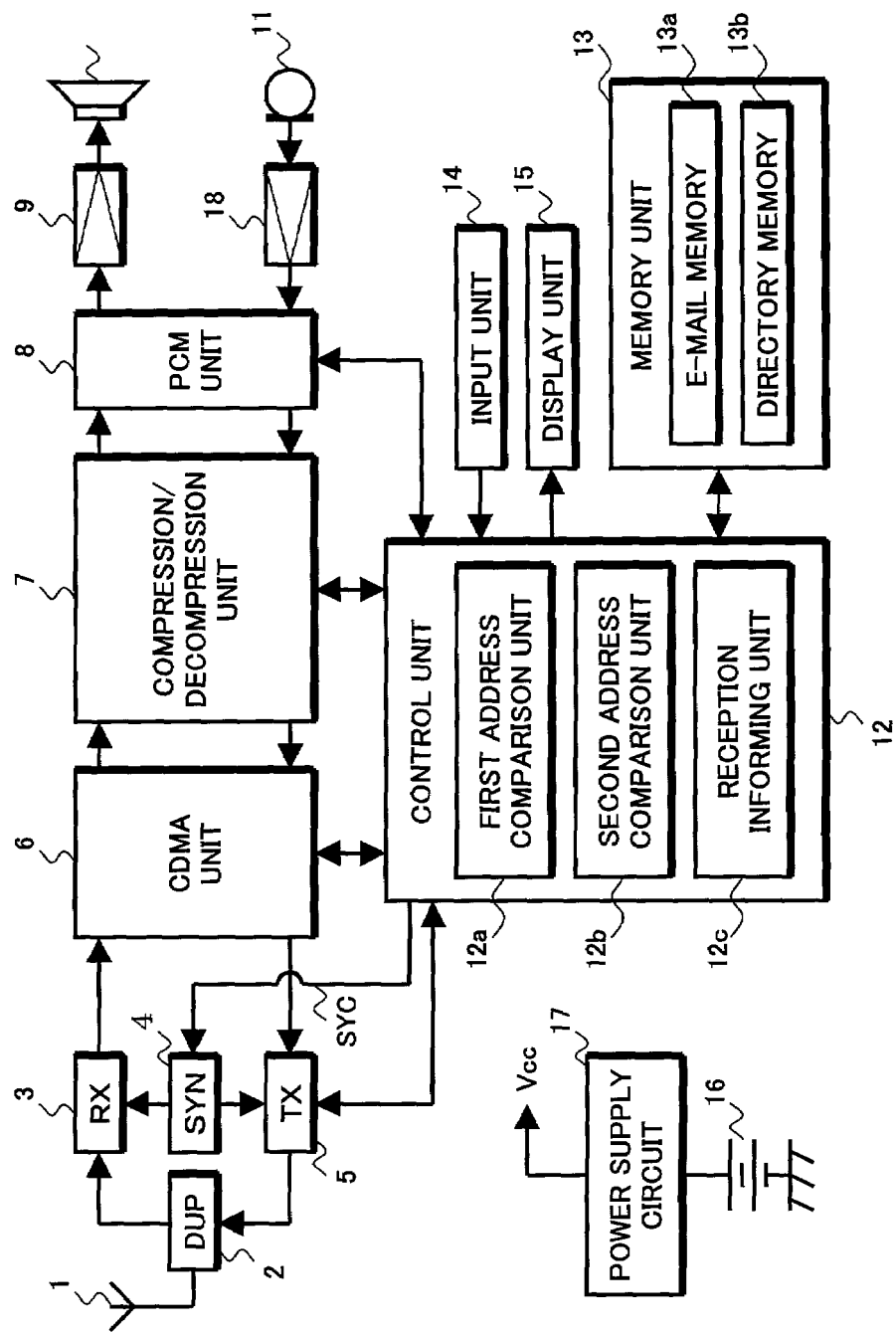
FIG. 2 is a block diagram showing a configuration of a mobile station consistent with the embodiments of the present invention.

FIG. 2 is a block diagram showing a configuration of a mobile station consistent with the embodiments of the present invention. For example, a radio frequency (RF) signal transmitted from base station BS1 is received by an antenna 1 of mobile station MS1, and is inputted to a reception circuit (RX) 3 via an antenna duplexer (DUP) 2. Reception circuit 3 performs a frequency transformation on the inputted signal by mixing with a reception oscillation signal that is provided from a frequency synthesizer (SYN) 4 to obtain an intermediate frequency (IF) signal. The frequency of the reception oscillation signal is instructed by a signal SYC that is provided from a control unit 12.

A code division multiple accessing (CDMA) unit 6 performs inverse spectrum spread processing on the IF signal using a spread code, such as a pseudorandom noise (PN) code, which is unique to each reception channel. Then, CDMA unit 6 performs an orthogonal demodulation, such as a quadrature pulse shift keying (QPSK) demodulation, on the inverse spectrum spread processed IF signal to obtain a demodulated data in a predetermined form in accordance with a data rate.

A compression/decompression unit 7 decompresses the demodulated data in accordance with the data rate that is provided by control unit 12, and performs error correcting decoding, such as Viterbi decoding, on the decompressed data to reproduce base-band voice data or packet data. Compression/decompression unit 7 inputs the reproduced voice data to a pulse-code modulation/demodulation (PCM) unit 8, and the reproduced packet data to control part 12.

PCM unit 8 performs pulse-code demodulation on the reproduced digital voice data to obtain an analog voice signal. After a reception amplifier 9 amplifies the analog voice signal, a speaker 10 outputs this amplified analog voice signal.

After extracting data from the reproduced packet data, control unit 12 stores the extracted data in a memory unit 13. Then control unit 12 reads out the extracted data from memory unit 13 and shows it on a display unit 15 following a display instruction inputted by a user with an input unit 14. Further, when a PDA or a note-type PC is connected to mobile station MS1, control unit 12 can input the reproduced packet data to the PDA or the PC via an external interface (not shown).

On the other hand, during voice communication, a transmission amplifier 18 amplifies the user's voice signal, which is inputted via a microphone 11 to the proper level. PCM unit 8 performs pulse-code modulation on the amplified analog voice signal to obtain digital voice data, and inputs the digital voice data to compression/decompression unit 7. Control unit 12 inputs packet data, such as an e-mail, to compression/decompression unit 7.

During the voice communication, compression/decompression unit 7 measures the amount of energy of the user's voice based on the digital voice data from PCM unit 8, and determines a data rate based on the measured amount of energy. Compression/decompression unit 7 compresses the digital voice data to obtain a signal in a form in accordance with the determined data rate. Then, compression/decompression unit 7 performs error correcting coding on this obtained signal and inputs the error correcting coded signal to CDMA unit 6. During the packet data communication, compression/decompression unit 7 performs error correcting coding on the packet data from control unit 12 and inputs the error correcting coded packet data to CDMA unit 6.

CDMA unit 6 performs an orthogonal modulation, such as a QPSK modulation, on the compressed voice data to obtain a carrier wave signal. Then, CDMA unit 6 performs spectrum spread processing on this orthogonal modulated carrier wave signal using a spread code, such as a PN code, which is unique to each transmission channel, and inputs the spectrum spread processed signal to a transmission circuit (TX) 5.

Transmission circuit 5 performs a frequency transformation on the spectrum spread processed signal by mixing with a transmission oscillation signal that is provided from frequency synthesizer 4 to obtain a RF signal. Then transmission circuit 5 performs high-frequency amplification only on efficient part of the RF signal in accordance with the transmission data rate provided by control unit 12, and outputs the high-frequency amplified RF signal. When receiving this high-frequency amplified RF signal via antenna duplexer 2, antenna 1 transmits it to a base station BS1 to which mobile station MS1 is connecting.

Input unit 14 comprises a dial key, a send key, a power key, an end key, a volume key, and a mode-selection key. Display unit 15 comprises a liquid crystal display (LCD) and a light-emitting diode (LED). For example, the LCD shows the present operation state of the user's mobile station MS1, telephone numbers of other mobile stations, received e-mails, and e-mails to be transmitted from mobile station MS1. The LED indicates an electric discharge state of a buttery 16. A power supply circuit 17 generates a predetermined power supply voltage Vcc from buttery 16 and supplies the voltage Vcc to each unit in mobile station MS1.

Memory unit 13 is used for storing voice data which is recorded and to be reproduced. Further, a memory unit 13 has an e-mail memory 13a for storing received e-mails, and a directory memory 13b for storing registered information about other parties who can be communication partners via the short message service.

Figure 5:
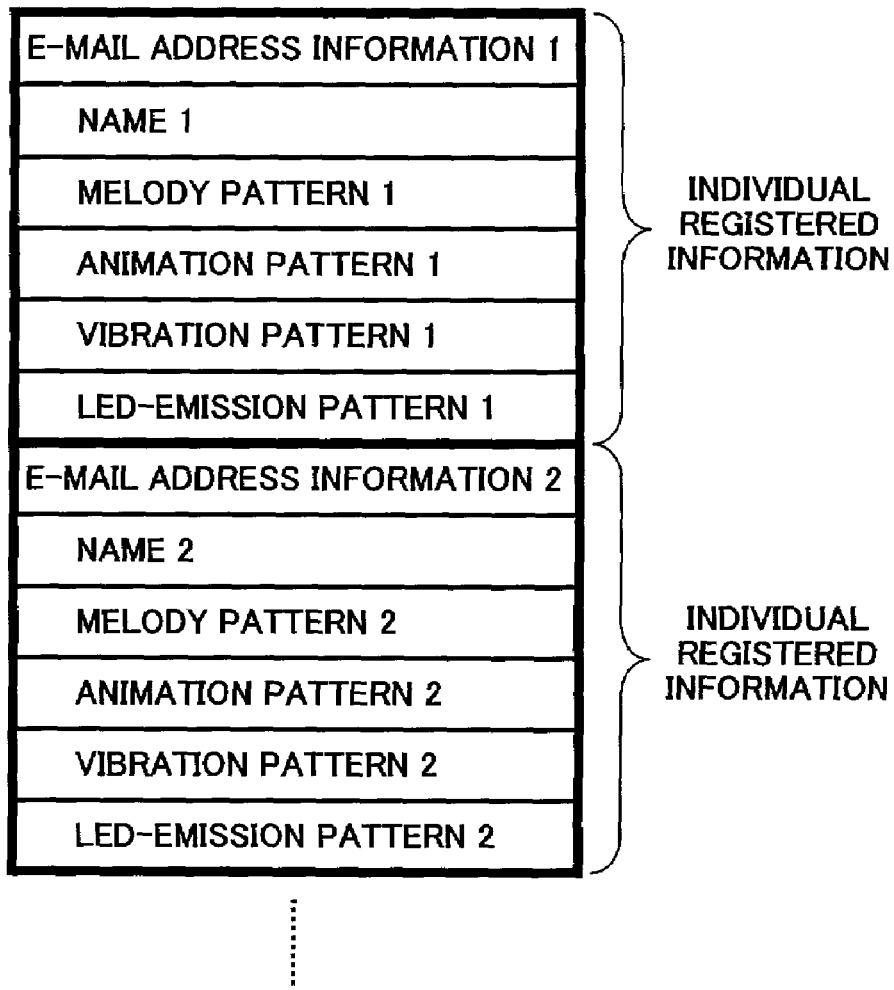
FIG. 5 is a diagram showing registered information stored in a directory memory shown in FIG. 2.

FIG. 5 is a diagram showing registered information stored in a directory memory 13b. The registered information is used in case of transmitting or receiving an e-mail and, as shown in FIG. 5, comprises a plurality of units for each communication partner (hereinafter referred to as "individual registered information"). Each individual registered information includes an e-mail address, a name of a communication partner, and an informing pattern, such as a melody pattern, an animation pattern, a vibration pattern, and a LED emission pattern.

Control unit 12, having a microprocessor as the main controller, has a function of establishing a communication link to a base station for an incoming or outgoing call, and a function of controlling the recording and reproducing of communication partners' and the user's voice using memory unit 13 during voice communication. Control unit 12 also has a first address-comparison unit 12a, a second address-comparison unit 12b, and a reception informing unit 12c, each of which performs when receiving an e-mail When receiving an e-mail, first address-comparison unit 12a extracts a sender's e-mail address (also referred to as "source address") from this e-mail. Then first address-comparison unit 12a searches directory memory 13b for an e-mail address that is the same as the extracted source address by comparing the source address with every communication partner's e-mail address stored in directory memory 13b.

When first address-comparison unit 12a can not find the same e-mail address, second address-comparison unit 12b searches directory memory 13b for an e-mail address similar to the source address. The similar e-mail address is slightly different from the source address, but the difference is within a predetermined permissible range. When finding the similar address in directory memory 13b, second address-comparison unit 12b regards the source address to be originally the same as this found e-mail address.

Difference between a capital letter and a small letter can be included within this permissible range. In such cases, the difference can be detected based on a predetermined relation between capital letters and small letters specified in a character code table of an American standard code for information interchange (ASCII), for example.

When the same e-mail address is found by first address-comparison unit 12a or when the similar e-mail address is found by second address-comparison unit 12b, reception informing unit 12c displays, on the LCD, the extracted source address with a sender's name included in a piece of individual registered information which includes the same or similar e-mail address, and informs the user of the reception of the e-mail in accordance with the informing pattern included in this individual registered information.

Figure 3:
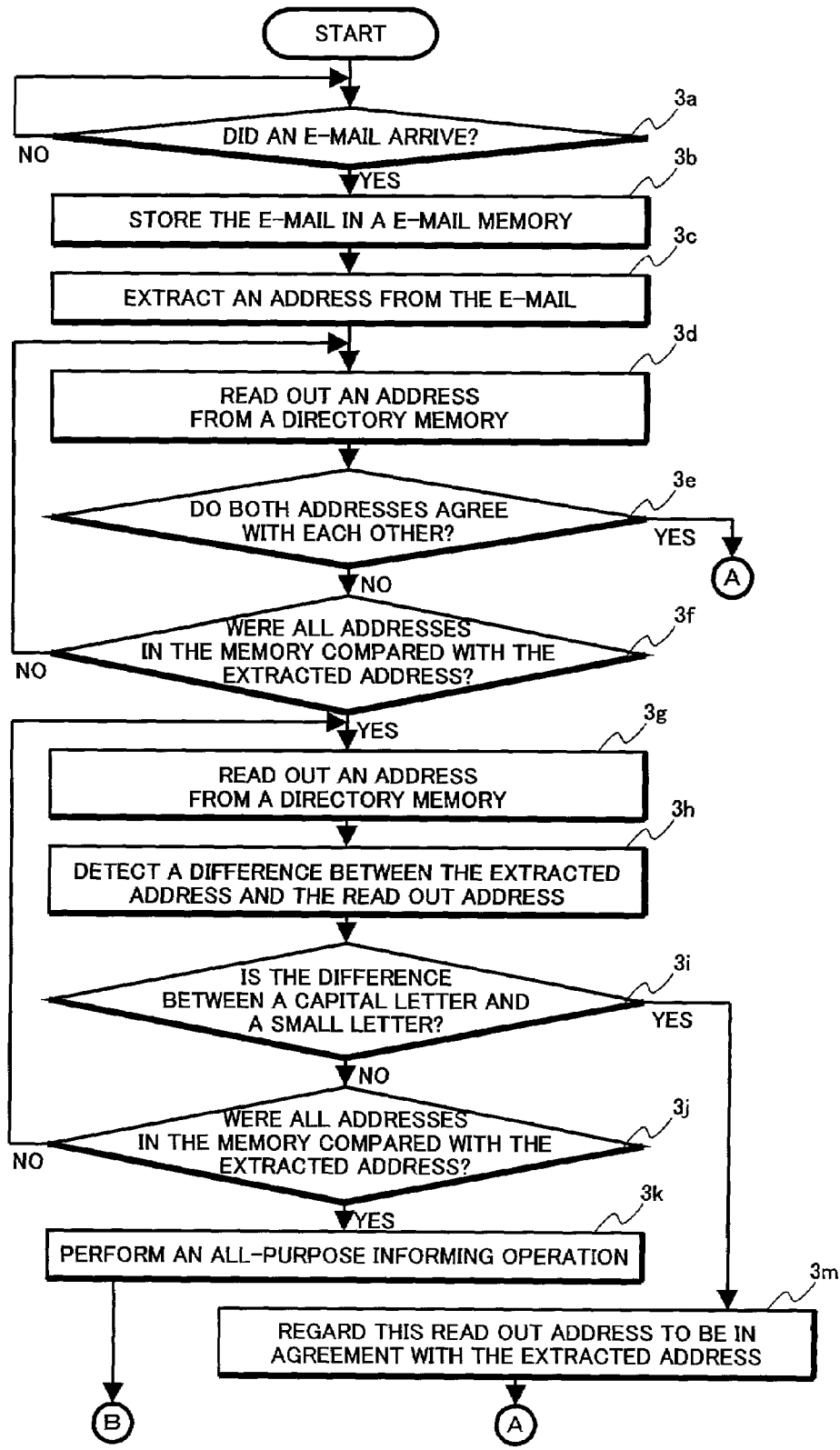
FIG. 3 is a flowchart showing the first half of a procedure for receiving an e-mail by the mobile station shown in FIG. 2.
Figure 4:
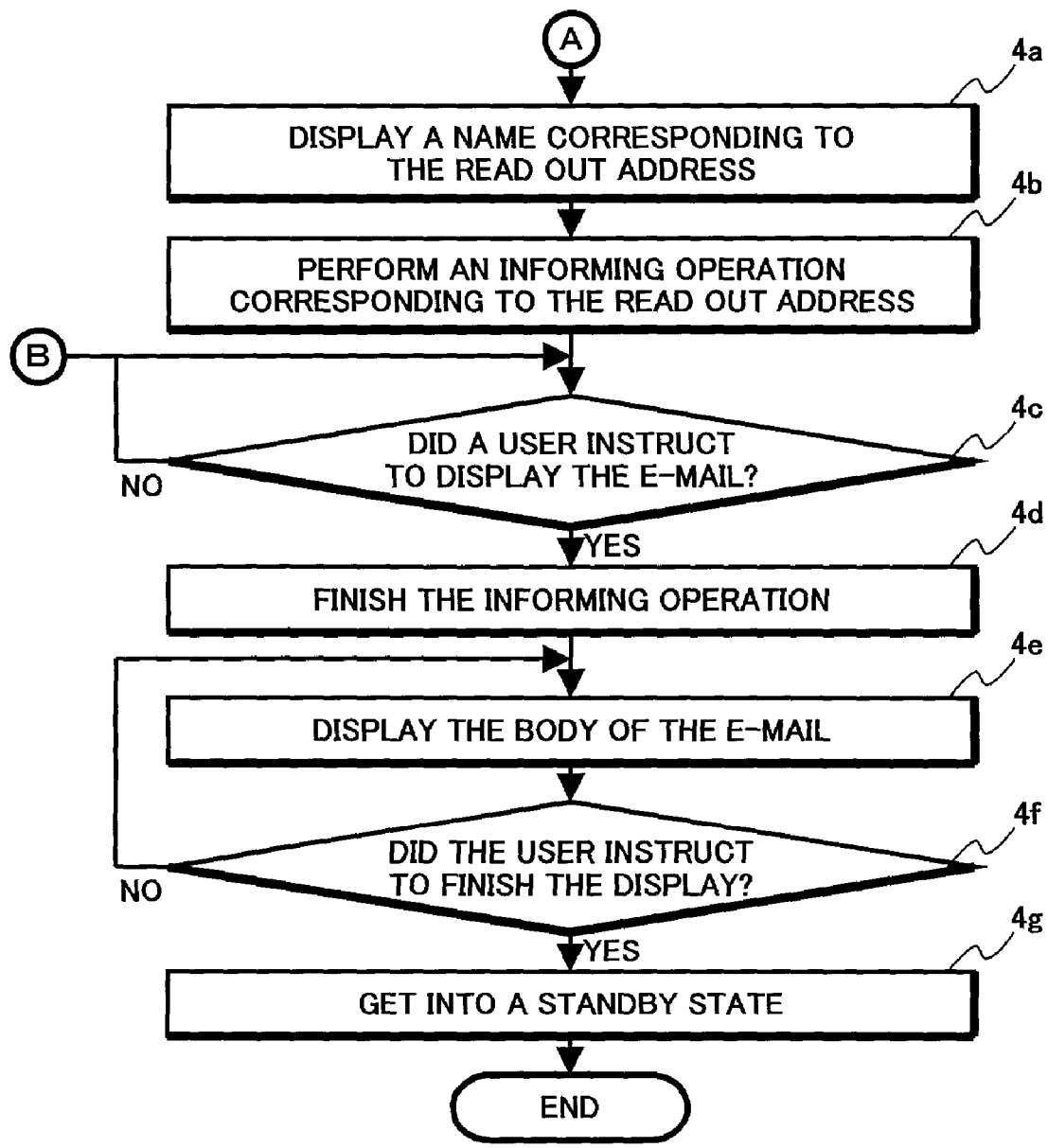
FIG. 4 is a flowchart showing the second half of the procedure for receiving an e-mail by the mobile station shown in FIG. 2.

Next, with reference to FIGS. 3 and 4, a procedure for receiving an e-mail by the mobile station shown in FIG. 2 will be explained. FIGS. 3 and 4 are flowcharts respectively showing the first and second half of the procedure.

Before receiving an e-mail, a user can set control unit 12 in a directory registration mode and register, in directory memory 13b, information about his or her communication partners, such as e-mail addresses, names, and informing patterns, by key operation of input unit 14. FIG. 5 is a diagram showing exemplary registered information stored in directory memory 13b.

A case where an e-mail is sent from mobile station MS1 to mobile station MS2 will be explained in this embodiment. The user of mobile station MS1 inputs information, such as a destination address (namely, the address of mobile station MS2), and a title of the e-mail in the header of the e-mail. And the user writes the body of the e-mail by key operation of input unit 14 and then sends the e-mail.

The e-mail is sent from mobile station MS1 to the mail server SV via base station BS1 and network NW, and is stored in this mail server SV. When receiving the e-mail, mail server SV calls mobile station MS2 in accordance with the destination address in the header and sends the e-mail to mobile station MS2.

On the other hand, mobile station MS2 is monitoring an incoming e-mail as well as an incoming call in a standby state (Step 3a in FIG. 3). When detecting the arrival of the e-mail, mobile station MS2 receives this e-mail and stores it in e-mail memory 13a (Step 3b).

Mobile station MS2 extracts the source address from the header of the received e-mail (Step 3c), reads out an individual registered information from directory memory 13b (Step 3d), and then determines whether the received source address agrees with an e-mail address included in the read out individual registered information by comparison (Step 3e).

When the received source address agrees with the e-mail address in the individual registered information, display unit 15 shows the received source address with a name included in the individual registered information (Step 4a in FIG. 4), and informs the user of the reception of the e-mail in accordance with the informing pattern included in the read out individual registered information (Step 4b).

For example, when a melody pattern 1 is included in the individual registered information as the informing pattern, a sounder (not shown) outputs a melody in accordance with this melody pattern 1. Also, when an animation pattern 1 is included in the individual registered information, display unit 15 shows an animation in accordance with this animation pattern 1. Additionally, when a vibration pattern 1 or an LED-emission pattern 1 is included in the individual registered information, a vibrator (not shown) vibrates in accordance with this vibration pattern 1 or an LED is driven in accordance with this LED-emission pattern 1, respectively.

When the user inputs an instruction to display the e-mail through input unit 14 while the reception of the e-mail is being informed, mobile station MS2 detects this instruction (Step 4c) and finishes informing the reception (Step 4d). Then mobile station MS2 reads out the body of the e-mail from received e-mail memory 13a and shows it on the LCD (Step 4e). Even if the LCD can not show the whole e-mail at once, the user can scroll the e-mail on the LCD. When the user inputs an instruction to finish displaying the e-mail (Step 4f), mobile station MS2 follows the instruction and get into a standby state (Step 4g).

On the other hand, when the received source address does not agree with the address in the individual registered information in Step 3e, mobile station MS2 determines whether there are any other individual registered information in directory memory 13b (Step 3f). When there is another individual registered information having not been compared with the received source address, mobile station MS2 reads out the individual registered information from directory memory 13b (Step 3d) and performs Steps 3e and 3f using this newly read out individual registered information. Then, mobile station MS2 repeats Steps 3d thorough 3f until the received source address is compared with all the individual registered information in directory memory 13b.

When an address that is the same as the received source address is not found in all individual registered information in directory memory 13b, mobile station MS2 reads out individual registered information from directory memory 13b (Step 3g), detects a difference between the received source address and the address included in this individual registered information by comparison (Step 3h), and then determines whether the detected difference is within the permissible range (Step 3i). In Step 3i, whether the detected difference is a permissible difference, such as a difference between a capital letter and a small letter, is determined.

When the detected difference is not the permissible difference as a result of the determination in Step 3i, the received source address is determined to be not similar to this included address. Then, whether the received source address has already been compared with all the individual registered information in directory memory 13b is determined (Step 3j). When there is other individual registered information having not been compared with the received source address, mobile station MS2 reads out one of the other individual registered information from directory memory 13b (Step 3g) and performs Steps 3h through 3j using this newly read out individual registered information. Then, mobile station MS2 repeats Steps 3g thorough 3j until the received source address is compared with all the individual registered information in directory memory 13b.

When an address similar to the received source address is not found in all individual registered information in directory memory 13b, mobile station MS2 determines that the e-mail is sent from a sender whose registered information is not stored in directory memory 13b, and performs all-purpose informing operation (Step 3k). That is, mobile station MS2 shows only the received source address on the LCD of display unit 15 and informs the user of the reception of the e-mail in accordance with a predetermined informing pattern including a melody pattern, an animation pattern, a vibration pattern, and an LED-emission pattern.

When the detected difference is within a permissible range as a result of the determination in Step 3i, mobile station MS2 regards the received source address to be originally the same as the address included in the individual registered information (Step 3m).

FIGS. 6(a) and 6(b) are diagrams respectively showing a screen image and the corresponding registered information stored in directory memory 13b.

For example, as shown in FIG. 6, when receiving a source address "aAa@aaa.com" although a correct address "aaa@aaa.com" is stored in directory memory 13b, mobile station MS2 regards the received source address as the similar address because their difference is between a capital letter "A" and a small letter "a". Then mobile station MS2 performs Steps 4a through 4g and informs the user of the reception of the e-mail in accordance with the informing pattern included in the same individual registered information.

In such cases, the LCD of display unit 15 shows the received source address "aAa@aaa.com" with its sender's name "XYZ, Inc." included in the same individual registered information.

As mentioned above, when receiving an e-mail, the mobile station in accordance with the first embodiment compares a received source address with all the addresses stored in directory memory 13b in turn. When a stored address which agrees with the received source address is not found, the mobile station reads out all the addresses stored in directory memory 13b in turn, and determines whether the difference between the received source address and the newly read out address is within a predetermined permissible range, such as a difference between a capital letter and a small letter. When an address within the permissible range is found in directory memory 13b, the mobile station regards the received source address to be originally the same as this found address, and informs the user of the reception of the e-mail in accordance with the informing pattern registered for each e-mail sender.

In accordance with the first embodiment, even though part of a source address included in a e-mail is changed from a small letter to a capital letter owing to a transmission error, this kind of error can be permitted and a mobile station which received the e-mail informs the user of the reception of the e-mail in accordance with the informing pattern which is registered for each e-mail sender and stored in directory memory 13b.

Figure 7:
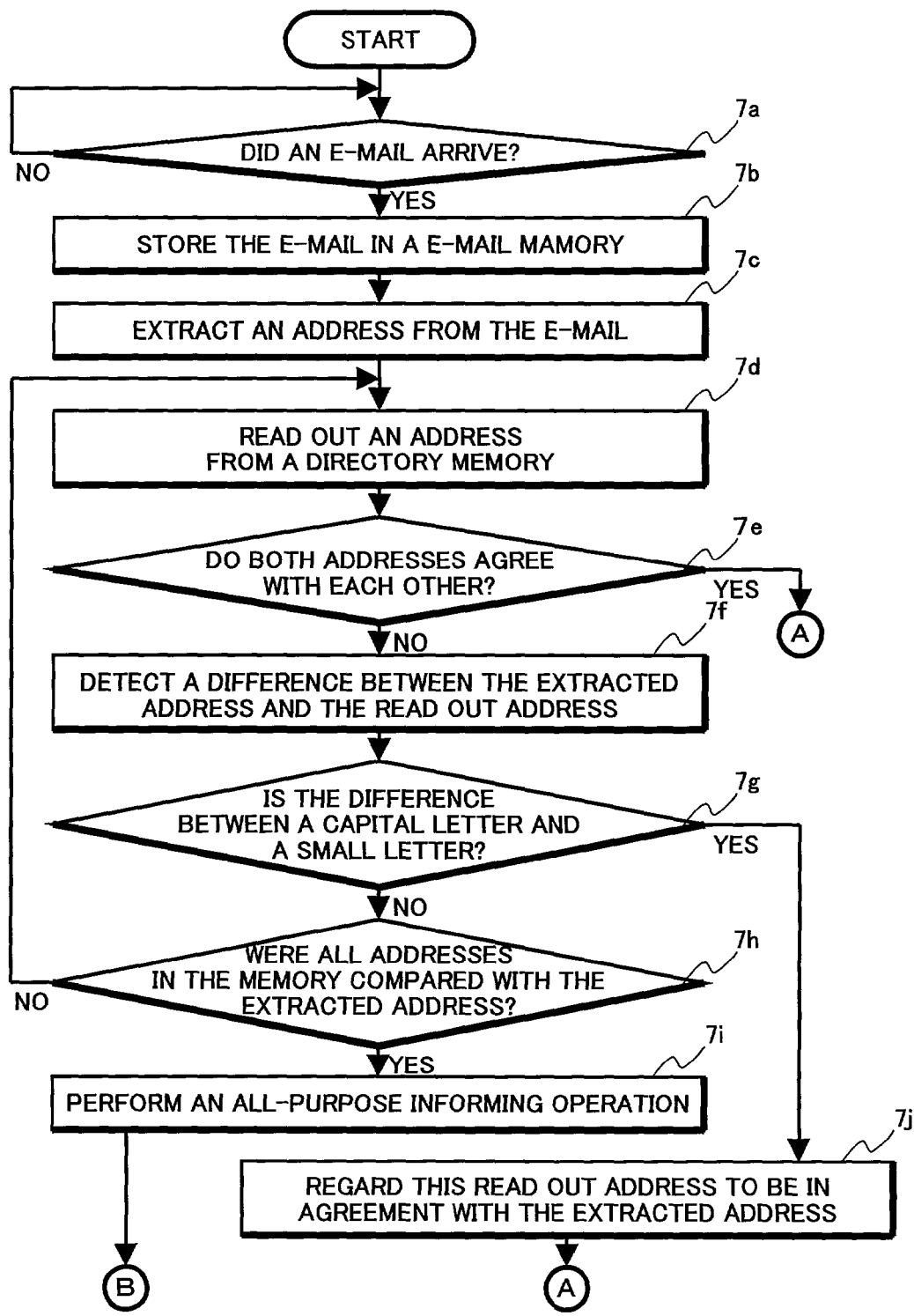
FIG. 7 is another flowchart showing the first half of the procedure for receiving an e-mail by the mobile station shown in FIG. 2.

Second Embodiment second embodiment of the present invention, also exemplifying the short message service, will be now explained. FIG. 7 is another flowchart showing the first half of the procedure for receiving an e-mail by the mobile station shown in FIG. 2. The second half of the e-mail receiving procedure is the same as shown in FIG. 4.

Before receiving an e-mail, a user can set control unit 12 in a directory registration mode and register, in directory memory 13b, information about his or her communication partners, such as e-mail addresses, names, and informing patterns, by key operation of input unit 14. FIG. 5 is a diagram showing exemplary registered information stored in directory memory 13b.

A case where an e-mail is sent from mobile station MS1 to mobile station MS2 will be explained in this embodiment. The user of mobile station MS1 inputs information, such as a destination address (namely, the address of mobile station MS2), and a title of the e-mail in the header of the e-mail. And the user writes the body of the e-mail by key operation of input unit 14 and then sends the e-mail.

The e-mail is sent from mobile station MS1 to the mail server SV via base station BS1 and network NW, and stored in this mail server SV. When receiving the e-mail, mail server SV calls mobile station MS2 in accordance with the destination address in its header and sends the e-mail to mobile station MS2.

On the other hand, mobile station MS2 is monitoring an incoming e-mail as well as an incoming call in a standby state (Step 7a in FIG. 7). When detecting the arrival of the e-mail, mobile station MS2 receives this e-mail and stores it in e-mail memory 13a (Step 7b).

Mobile station MS2 extracts a source address from the header of the received e-mail (Step 7c), reads out individual registered information from directory memory 13b (Step 7d), and then determines whether the received source address agrees with an address included in the read out individual registered information by comparison (Step 7e).

When the received source address agrees with the address in the individual registered information, display unit 15 shows the received source address with a name included in the individual registered information (Step 4a in FIG. 4), and informs the user of the arrival of the e-mail in accordance with the informing pattern included in the read out individual registered information (Step 4b).

When the user inputs an instruction to display the e-mail through input unit 14 while the arrival of the e-mail is being informed, mobile station MS2 detects this instruction (Step 4c) and finishes informing the reception (Step 4d). Then mobile station MS2 reads out the body of the e-mail from received e-mail memory 13a and shows it on the LCD (Step 4e). Even if the LCD can not show the whole e-mail at once, the user can scroll the e-mail on the LCD. When the user inputs an instruction to finish displaying the e-mail (Step 4f), mobile station MS2 follows the instruction and get into a standby state (Step 4g).

On the other hand, when the received source address does not agree with the address in the individual registered information in Step 7e, mobile station MS2 detects the difference between the received source address and the address included in this individual registered information by comparison (Step 7f), and then determines whether the detected difference is within a permissible range, such as a difference between a capital letter and a small letter (Step 7g).

When the detected difference is not the permissible difference as a result of the determination in Step 7g, the received source address is determined to be not similar to this included address. Then, whether the received source address has already been compared with all the individual registered information in directory memory 13b is determined (Step 7h). When there is other individual registered information having not been compared with the received source address, mobile station MS2 reads out one of the other individual registered information from directory memory 13b (Step 7d) and performs Steps 7e through 7g using this newly read out individual registered information. Then, mobile station MS2 repeats Steps 7e thorough 7g until the received source address is compared with all the individual registered information in directory memory 13b.

When an address similar to the received source address is not found in all individual registered information in directory memory 13b, mobile station MS2 determines that the e-mail is sent from a sender whose registered information is not stored in directory memory 13b, and performs all-purpose arrival informing (Step 7i). That is, mobile station MS2 shows only the received source address on the LCD of display unit 15 and informs the user of the reception of the e-mail in accordance with a predetermined informing pattern including a melody pattern, an animation pattern, a vibration pattern, and an LED-emission pattern.

When the detected difference is the permissible difference as a result of the determination in Step 7g, mobile station MS2 regards the received source address to be originally the same as the address included in the individual registered information (Step 7j).

FIGS. 8(a) and 8(b) are diagrams respectively showing another screen image and the corresponding registered information stored in directory memory 13b.

For example, as shown in FIG. 6, when receiving a source address "aAa@aaa.com" although a correct address "aaa@aaa.com" is stored in directory memory 13b, mobile station MS2 regards the received source address as the similar address because their difference is between a capital letter "A" and a small letter "a". Then mobile station MS2 performs Steps 4a through 4g and informs the user of the reception of the e-mail in accordance with the informing pattern included in the same individual registered information.

In such cases, the LCD of display unit 15 shows the received source address "aAa@aaa.com" with its sender's name "XYZ, Inc." included in the same individual registered information.

In accordance with the second embodiment, the mobile station reads out a piece of individual registered information and determines whether a received source address agrees with an address included in this individual registered information by comparison. Then, when the received source address does not agrees with the read out address, the mobile station determines whether the difference between these two address is within a permissible range. This two-step determination is performed on every individual registered information stored in the directory memory one by one.

Other Embodiments

The present invention is not limited to the above-mentioned embodiments. For example, although each of the mobile stations in these embodiments shows a received source address on the LCD of display unit 15 even when the received address is regarded to be originally the same as a source address registered in directory memory 13b, they may show the registered correct address in place of the received erroneous address, as shown in FIGS. 8(a) and (b). In such cases, the mobile station always displays the correct address so that it can be convenient for a user to answer an e-mail without making an error in inputting a destination address.

Also, when displaying the received address, the mobile station may show a massage that there is a misspelling in the received address on the LCD. The mobile station may not only show the correct address in place of the erroneous address but also correct the erroneous address so that it can be possible for a user to answer an e-mail using the corrected address without inputting a destination address.

Further, a received address may be regarded to be originally the same as a registered address, as well as when the difference between them is in a capital letter or a small letter, when their difference is (1) in hiragana or katakana, (2) the existence of a space, (3) the existence of an accent, and (4) the existence of different letters, the number of which is less than a predetermined one. They may be regarded the same (5) when native Japanese reading of a Chinese character in one address is the same as letters in kana in the other address. In the above-mentioned cases, similarly to when the difference is in a capital letter or a small letter, second comparison address unit 12b may detect these differences using the character code table.

Additionally, the present invention can be applied, as well as to when sending an e-mail between mobile stations, to when sending an e-mail between mobile stations via the Internet and between wire communication terminal units.

Also, the type and structure of the communication terminal unit, a protocol for sending an e-mail, how to compare a received address and a registered address, how to inform a user of a reception of an e-mail can be changed without overstepping the purport of the present invention Further, the present invention can be applied to a system in which a user inputs a source address by himself/herself when sending the e-mail. In such cases, the user may make an error in inputting his/her own source address. However, the reason why the misspelling occurs in the source address does not matter for the present invention.

What is claimed is:

1. A communication terminal capable of receiving a message, comprising:

a memory to store a mail address;

first means for determining whether a sender mail address, which is included in the received message, agrees with the mail address; and second means for determining whether the difference between the mail address and the sender mail address is in a capital letter or a small letter if the first determining means concludes that the mail address and the sender mail address do not agree, and for recognizing the sender mail address to be in agreement with the mail address if the difference is in a capital letter or a small letter.

2. The communication terminal of claim 1, wherein:

the second determining means detects the difference using a character code table which defines the relation between the capital letter and small letter.

3. A communication terminal capable of receiving a message, comprising:

a memory to store an e-mail address;

first means for determining whether a source address, which is included in the received message, agrees with the e-mail address stored in the memory; and second means for determining whether the difference between the e-mail address and the source address is existence of a space in either of the e-mail addresses when the first determining means concludes that the e-mail address and the source address do not agree, and for recognizing the source address to be in agreement with the e-mail address stored in the memory when the difference is existence of a space.

4. A communication terminal capable of receiving a message, comprising:

a memory to store an e-mail address;

first means for determining whether a source address, which is included in the received message, agrees with the e-mail address stored in the memory;

second means for determining whether the difference between the e-mail address and the source address is in a capital letter or a small letter if the first determining means concludes that the e-mail address and the source address do not agree, and for recognizing the source address to be in agreement with the e-mail address stored in the memory if the difference is in a capital letter or a small letter; and a display to display the e-mail address stored in the memory when the source address is regarded to be in agreement with the e-mail address stored in the memory.

5. A communication terminal capable of receiving a message, comprising:

a memory to store an e-mail address;

first means for determining whether a source address, which is included in the received message, agrees with the e-mail address stored in the memory;

second means for determining whether the difference between the e-mail address and the source address is in a capital letter or a small letter if the first determining means concludes that the e-mail address and the source address do not agree, and for recognizing the source address to be in agreement with the e-mail address stored in the memory if the difference is in a capital letter or a small letter;

a display to display the source address; and means for informing a user about an error of the source address if the source address is regarded to be in agreement with the e-mail address stored in the memory.

6. A communication terminal capable of receiving a message, comprising:

a memory to store an e-mail address;

first means for determining whether a source address, which is included in the received message, agrees with the e-mail address stored in the memory;

second means for determining whether the difference between the e-mail address and the source address is in a capital letter or a small letter if the first determining means concludes that the e-mail address and the source address do not agree, and for recognizing the source address to be in agreement with the e-mail address stored in the memory if the difference is in a capital letter or a small letter; and means for addressing a message, which is a reply to the received message, to the e-mail address stored in the memory if the source address is regarded to be in agreement with the e-mail address stored in the memory.

7. A communication terminal capable of receiving a message, comprising:

a memory to store a plurality of first addresses;

first means for searching the memory for the first address which agrees with a second address included in the received message;

second means for searching the memory for the first address which is different from the second address in a capital letter or a small letter if the first searching means concludes that no first addresses are in agreement with the second address, and recognizing the second address to be in agreement with the first address if the difference is in a capital letter or a small letter.

8. The communication terminal unit of claim 7, wherein:

the second searching means detects the difference using a character code table which defines the relation between the capital letter and small letter.

9. A communication terminal capable of receiving a message, comprising:

a memory to store a plurality of e-mail addresses;

first means for searching the memory for the e-mail address which agrees with a source address included in the received message; and second means for searching the memory for the e-mail address whose difference from the source address is existence of a space in either of the addresses when the first searching means concludes that no e-mail addresses are in agreement with the source address, and recognizing the source address to be in agreement with the e-mail address in the memory when the difference is existence of a space.

10. A communication terminal capable of receiving a message, comprising:

a memory to store a plurality of e-mail addresses;

first means for searching the memory for the e-mail address which agrees with a source address included in the received message;

second means for searching the memory for the e-mail address which is different from the source address in a capital letter or a small letter if the first searching means concludes that no e-mail addresses are in agreement with the source address, and recognizing the source address to be in agreement with the e-mail address in the memory if the difference is in a capital letter or a small letter; and a display to display the e-mail address stored in the memory if the source address is regarded to be in agreement with the e-mail address stored in the memory.

11. A communication terminal capable of receiving a message, comprising:

a memory to store a plurality of e-mail addresses;

first means for searching the memory for the e-mail address which agrees with a source address included in the received message;

second means for searching the memory for the e-mail address which is different from the source address in a capital letter or a small letter if the first searching means concludes that no e-mail addresses are in agreement with the source address, and recognizing the source address to be in agreement with the e-mail address in the memory if the difference is in a capital letter or a small letter;

a display to display the source address included in the received message; and means for informing a user about an error of the source address if the source address is regarded to be in agreement with the e-mail address stored in the memory.

12. A communication terminal capable of receiving a message, comprising:

a memory to store a plurality of e-mail addresses;

first means for searching the memory for the e-mail address which agrees with a source address included in the received message;

second means for searching the memory for the e-mail address which is different from the source address in a capital letter or a small letter if the first searching means concludes that no e-mail addresses are in agreement with the source address, and recognizing the source address to be in agreement with the e-mail address in the memory if the difference is in a capital letter or a small letter; and means for addressing a message, which is a reply to the received message, to the e-mail address stored in the memory if the source address is regarded to be in agreement with the e-mail address stored in the memory.

13. A communication terminal capable of receiving a message, comprising:

a memory to store an e-mail address and a name corresponding to the e-mail address;

first means for determining whether a source address, which is included in the received message, agrees with the e-mail address stored in the memory;

second means for determining whether the difference between the e-mail address and the source address is in a capital letter or a small letter if the first determining means concludes that the e-mail address and the source address do not agree, and for recognizing the source address to be in agreement with the e-mail address stored in the memory if the difference is in a capital letter or a small letter; and a display to display the name, if the source address is regarded to be in agreement with the e-mail address in the memory, corresponding to the e-mail address regarded to be in agreement with the source address.

14. A communication terminal capable of receiving a message, comprising:

a memory to store a plurality of e-mail addresses and names corresponding to the e-mail addresses;

first means for searching the memory for the e-mail address which agrees with a source address included in the received message;

second means for searching the memory for the e-mail address which is different from the source address in a capital letter or a small letter if the first searching means concludes that no e-mail addresses are in agreement with the source address, and recognizing the source address to be in agreement with the e-mail address in the memory if the difference is in a capital letter or a small letter; and a display to display the name, if the source address is regarded to be in agreement with the e-mail address in the memory, corresponding to the e-mail address regarded to be in agreement with the source address.

* * * * *